2 Sheets—Sheet 2.
J. C. TRAIN.
Bee-Hives.
No. 196,060. Patented Oct. 9, 1877.
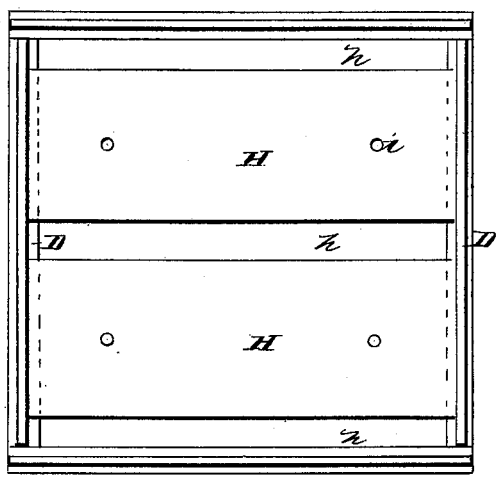
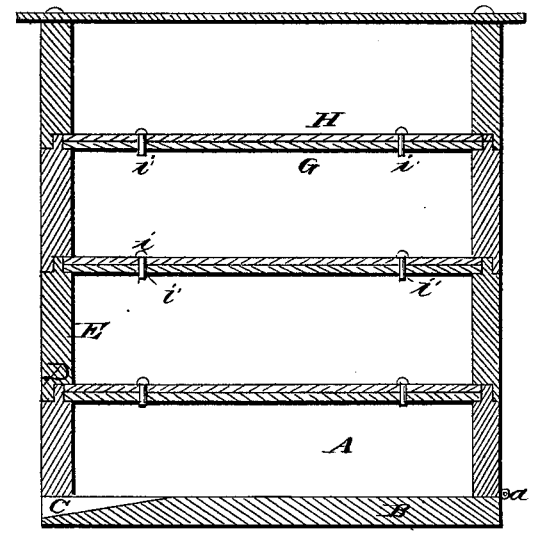
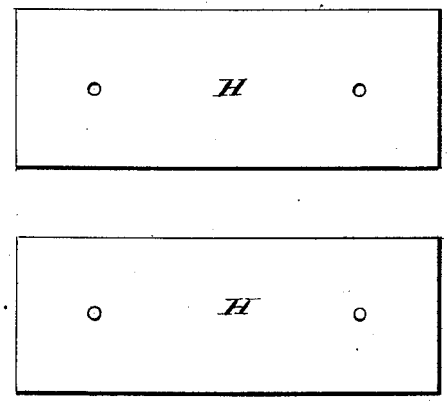
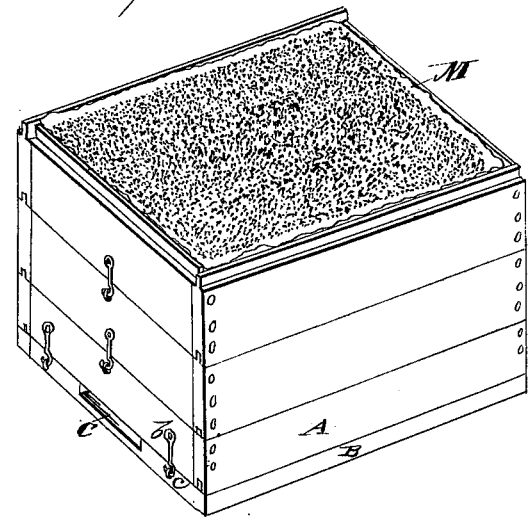
WITNESSES
Ed. J. Nottingham
A. W. Bright
INVENTOR
J. C. Train,
By H. A. Seymour
ATTORNEYS

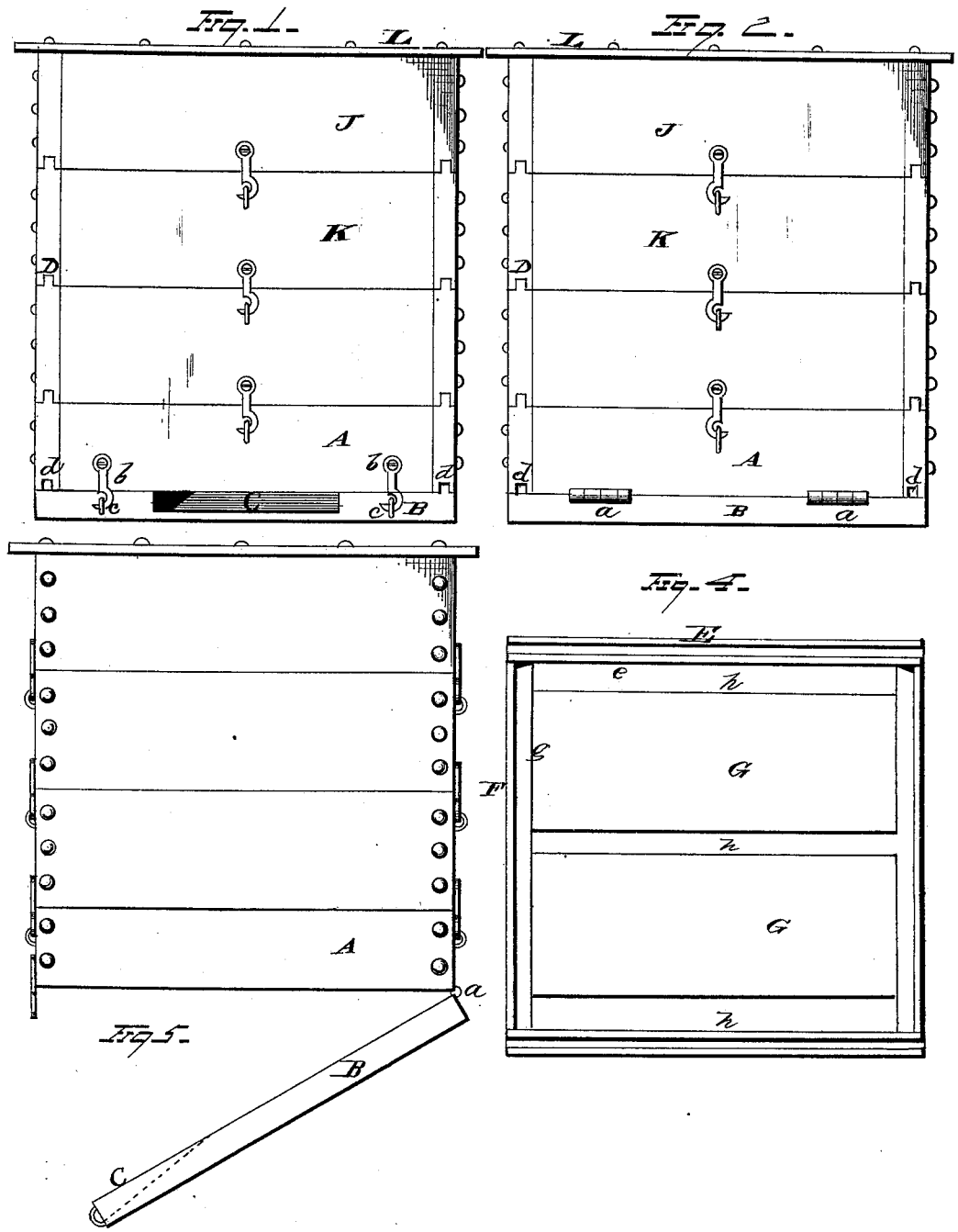

UNITED STATES PATENT OFFICE.

JARVIS C. TRAIN, OF LOWELL, MICHIGAN.

IMPROVEMENT IN BEE-HIVES.

Specification forming part of Letters Patent No. 196,060, dated October 9, 1877; application filed July 30, 1877.

*To all whom it may concern:*

Be it known that I, JARVIS. C. TRAIN, of Lowell, in the county of Kent and State of Michigan, have invented certain new and useful Improvements in Bee-Hives; and I do hereby declare the following to be a full, clear, and exact description of the invention, such as will enable others skilled in the art to which it pertains to make and use it, reference being had to the accompanying drawings, which form part of this specification.

My invention relates to an improvement in bee-hives, the object being to provide a bee-hive of such construction that it may readily be adjusted in size to meet the wants of either large or small colonies of bees, and the several sections removably secured together in a water-tight manner, to exclude moisture and dampness from the interior of the hive; also, to provide space in the lower portion of the hive wherein the moths may collect and be removed therefrom without disturbing the bees.

In the accompanying drawings, Figure 1 shows a side elevation of the front of the hive. Fig. 2 is a side elevation of the rear side of the hive. Fig. 3 represents the hive with the hinged bottom turned down. Fig. 4 is a plan view of one of the sections. Fig. 5 is a plan view of the hive with one of the sections removed. Fig. 6 is a vertical section, and Fig. 7 shows the removable comb-supports. Fig. 8 represents the upper portion of the hive when the bees have gone into winter-quarters.

A represents the lower section of the hive, having a bottom board, B, hinged thereto at *a a*, the bottom being removably secured to section A by means of hooks *b* and staples *c*. C is the opening for the entrance of the bees, said opening being formed in the hinged bottom B, and beveled or inclined outwardly and downwardly, in order to facilitate the removal of dead bees and other matter, and also to prevent the entrance of rain into the hive. The lower edges of the side walls of section A are provided with grooves or mortises *d*, extending their entire length, said grooves forming, when the bottom is secured in place, continuous side passage within the side walls of the lower section. These grooves are used to entice the bee-moths, which will enter these passages thus formed and lay their eggs therein, and the eggs may be readily removed from these grooves without disturbing the bees by simply lowering the hinged bottom and cleaning the eggs away from the grooves, this operation being accomplished without disturbing the interior of the hive.

In order to provide tight joints between the several sections of the hive, the upper edges of each section—excepting, of course, the cover—are constructed as follows: The sides have their upper edges provided with a central tenon, D, which enters corresponding center mortise formed in the lower edge E of the next upper section. The front and rear walls of each section have their upper edges formed with tenons F, the inner shoulders *e* being cut away sufficiently to afford bearings for the opposite ends of the fixed and removable comb-supporting boards G H, the upper surface of the removable comb-support coming flush with the tenon.

The front and rear sides of the next upper section are provided with rabbeted inner edges *g*, which snugly fit the rabbeted front and rear edge of the lower section. This form of matched edges not only effectually prevents the entrance of moisture to the interior of the hive, but also serves as a bearing for the comb-supports, and as the movable comb-support is flush with the upper edge of its section it can be easily removed with the comb without cutting or breaking the comb or hurting the bees.

G represents the fixed supports, which are secured in any desired manner upon the shoulder formed on the interior of each section. In the present instance two fixed supports are provided for each section; but it is evident that any desired number of such supports may be employed. These supports are placed at a sufficient distance apart to form openings *h* for the passage of the bees to the different compartments of the hive. H are the removable comb-supports, each one being provided with pins *i*, which enter corresponding openings *i'* in the fixed supports. These pins serve the purpose of preventing any lateral displacement of the movable comb-supports as the hive is being moved, and thus always insure a free open passage between the different compartments.

When it is desired to remove the comb from the hive it is simply necessary to remove the section and then take off the removable comb-support with the honey-comb adhering thereto. This operation is very readily and quickly performed without the slightest danger of breaking the comb or hurting the bees.

It is evident that any number of sections may be employed, and a complete hive secured to the apiarian at all times, as, in case the honey is to be removed from the upper section only, the upper section may be removed entire, if desired, and, the cover or top J being replaced, as all the sections are made to accurately fit each other, a complete and water-tight hive is thus secured.

The upper central sections K, of any desired number, are each constructed with matched edges, and provided with comb-supporting plates or frames, the same as hereinafter described, while the cap or top section is provided with a close top, L, the edges of which project slightly over the body of the hive to protect the same from the weather.

By the use of hives of the construction above set forth the bees will be enabled to withstand cold weather better than in hives of ordinary construction. When the bees are going into winter-quarters I place a cloth, M, on the top section, and deposit thereon dry bran or other equivalent absorbent material, which substance operates to accumulate the breath or other exhalation from the bees. The cloth and bran can be readily changed and removed when found necessary.

Having fully described my invention, what I claim as new, and desire to secure by Letters Patent, is—

1. In a sectional bee-hive, the combination, with each of the sections thereof, of two or more fixed partitions, G, and a corresponding number of comb-supports, H, removably secured to the fixed partitions, substantially as described.

2. In a sectional bee-hive, the combination, with the lower section having grooves or mortises formed in its lower side edge, of a hinged bottom, substantially as set forth.

3. In a sectional bee-hive, the sections formed with two upper edges provided with tenons and two with rabbets, the inner edges $e$ of which are cut away to afford bearings for the comb-supports G and H, while the lower edges are formed with two mortised edges and two rabbeted edges, in combination with such supports, substantially as set forth.

In testimony that I claim the foregoing I have hereunto set my hand this 14th day of July, 1877.

JARVIS C. TRAIN.

Witnesses:
JAMES H. WEEKS,
ORSON H. LOOK.